United States Patent [19]

Coffinberry

[11] Patent Number: 5,267,608
[45] Date of Patent: Dec. 7, 1993

[54] HEAT EXCHANGER AND REACTOR FOR AIRCRAFT AND PROPULSION SYSTEMS

[75] Inventor: George A. Coffinberry, West Chester, Ohio

[73] Assignee: General Electric Company, Cincinnati, Ohio

[21] Appl. No.: 920,068

[22] Filed: Jul. 27, 1992

[51] Int. Cl.$^5$ .................................... F28D 15/02
[52] U.S. Cl. ................... 165/70; 165/41; 165/104.14; 422/200; 422/201; 422/211; 422/311; 62/7
[58] Field of Search ............ 165/104.14, 104.21, 165/70; 422/201, 311, 206, 200; 62/7

[56] References Cited

U.S. PATENT DOCUMENTS

| | | | |
|---|---|---|---|
| 1,873,876 | 8/1932 | Downs | 165/104.21 |
| 4,169,911 | 10/1979 | Yoshida et al. | 428/36 |
| 4,315,893 | 2/1982 | McCallister | 422/200 |
| 4,331,632 | 5/1982 | Galloway | 422/206 |
| 4,966,229 | 10/1990 | Senterfitt | 165/41 |
| 4,974,667 | 12/1990 | Sun et al. | 165/41 |

Primary Examiner—Albert W. Davis, Jr.
Attorney, Agent, or Firm—Jerome C. Squillaro

[57] ABSTRACT

A heat exchanger for use in high speed aircraft propulsion engines provides a plurality of heat pipes wherein the evaporator sections of the heat pipes are disposed in a hot fluid flow conduit and the condenser sections are disposed in a cold fluid flow conduit and the flow conduits are separated by a vented cavity and thin heat transfer fins are disposed around the condenser sections. Another embodiment provides a reactor using the heat exchanger and having a metalized, preferably with platinum, carbon fiber supported catalyst in the form of batting woven between the condenser sections of the heat pipes. The batting has platinum in the form of particles or more preferably in the form of small crystallites, typically about 1 to 5 nanometers in size.

5 Claims, 1 Drawing Sheet

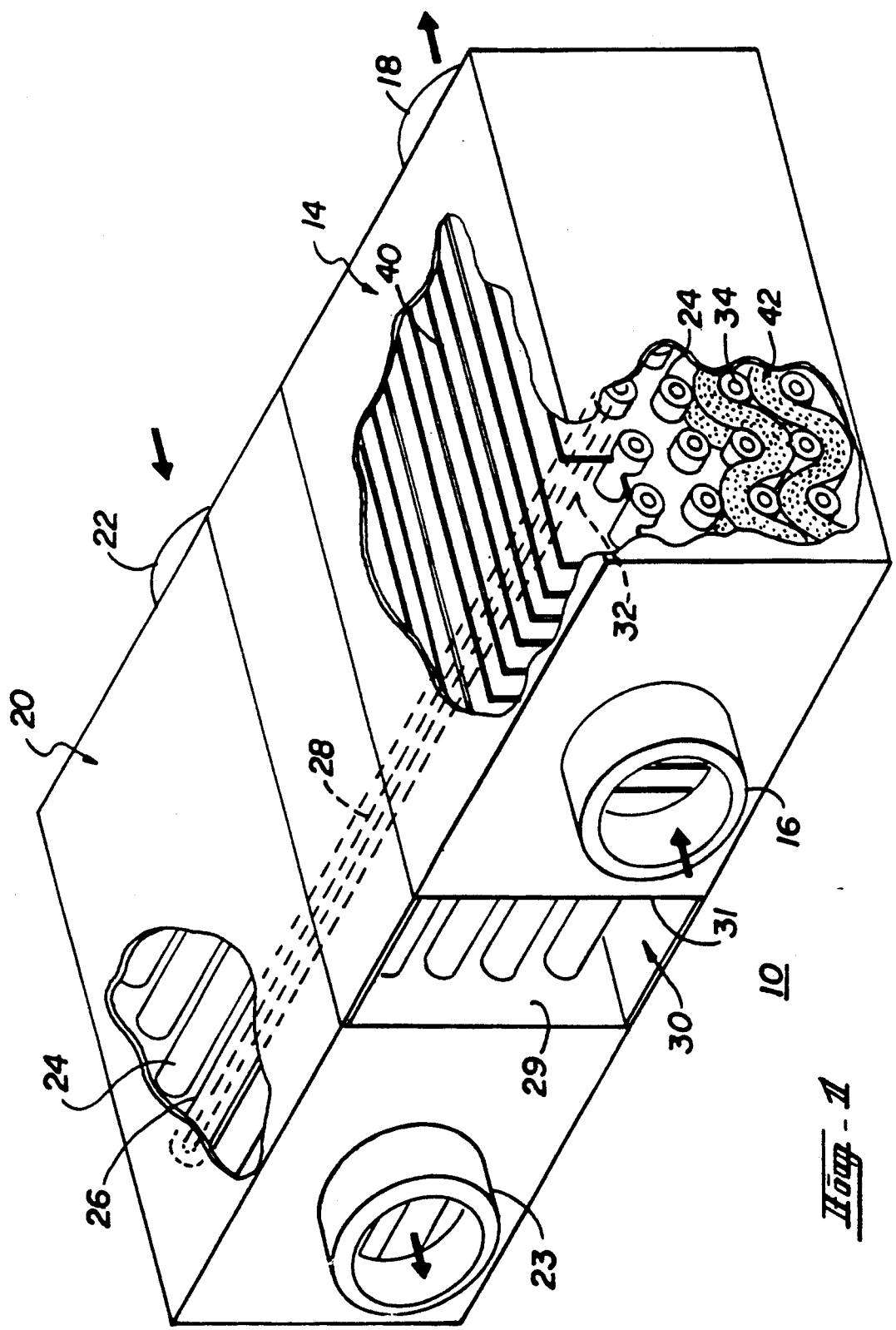

HEAT EXCHANGER AND REACTOR FOR AIRCRAFT AND PROPULSION SYSTEMS

BACKGROUND OF THE INVENTION

1. Field of the Invention

This invention relates to heat exchangers and catalytic reactors used in aircraft and propulsion systems. In particular, the invention relates to heat exchangers which convert liquid fuel to gaseous fuel and reactors which change the chemical composition to gaseous fuel.

2. Description of Related Art

Future aircraft and propulsion systems will require very high levels of cooling by the fuel used to power the aircraft. Fuels contemplated for use with the present invention include cryogenic fuels, such as liquid methane or liquid propane, more exotic noncryogenic hydrocarbon fuels such as methylcyclohexane, and the more conventional aircraft hydrocarbon fuel mixtures such as JP-4, JP-5 or JET-A. It is well known to use heat exchangers to cool aircraft and aircraft engine parts using the sink capacity of fuel. It also known to use a reactor having a heat exchanger with more exotic non-cryogenic hydrocarbon fuels such as methylcyclohexane.

The present invention also provides for using the fuel's additional heat sink capacity obtained from the latent heat and the sensible heat of the fuel (due to the fuel changing from liquid to gas) in addition to an increase in temperature. Furthermore, for certain fuels the present invention makes it more feasible to achieve additional heat sink by changing the chemical composition of the fuel.

Numerous applications for heat exchangers and reactors are envisioned for future aircraft and propulsion systems. These applications include structural cooling needed for supersonic and hypersonic aircraft, cooling of air used to cool turbine blades in high performance turbojet engines and cooling for special applications.

It is generally well known to construct heat exchangers and reactors for this type of application from tubes which contain the fuel. Hot air is typically directed over the tubes which, at elevated temperatures, cause the fuel to undergo auto-oxidation reactions with oxygen dissolved in the fuel to produce deposits generally in the form of polymer gums and sediments which adhere to the tube wall. At very high temperature, coke may be produced as the result of both polymerization and pyrolysis; i.e. molecular fragmentation. Regardless of the many complex chemical factors, the tubular heat exchanger can tolerate only a very limited amount of deposit formation on the tube wall since these deposits have very low thermal conduitivity and simply serve to insulate the tube from the fuel. This drastically reduces the efficiency of the heat exchanger and poses a potential risk of engine failure as well as increased costs of operation and construction.

It is generally known that improvements can be made by removing oxygen, maintaining tight control of fuel chemistry, and avoiding contact with adverse catalytic agents such as certain pure metals. However, such methods are not economically feasible nor simple, even with the use of ordinary liquid JET-A kerosene and its economical conversion to gaseous fuel.

Very high heat sink fuels rely on chemical conversion in addition to sensible heating and change in phase. One such fuel is methylcyclohexane (MCH). The endothermic reaction is:

Methylcyclohexane+Heat→Toluene+Hydrogen $$C_7H_{14} \rightarrow C_7H_8 + 3H_2$$

For applications which relate to this invention it has been common practice to consider a tubular reactor in which the fuel flows through a catalytic pack bed inside the tubes. The packed bed is typically fine beads of aluminum oxide interspersed with a metal such as platinum. This design approach is basically the same as described previously for the heat exchanger. The heat exchange and reactor functions are greatly diminished by fuel deposits formed on the tube wall that form and serve as an insulator. Furthermore, any deposits formed on the packed bed poisons the bed and diminishes the capability for chemical conversion related to the reactor function.

Recognizing that the catalytic bed is an auxiliary function to heat transfer across the tube wall, it is evident that pressure drop associated with the bed is a negative effect and in fact is a major drawback to this common design approach. The catalyst bed results in enormous fuel pressure drop, not otherwise evident in the same open tube as used for the plain heat exchanger.

In conventional designed heat exchangers and reactors, the tubes containing fuel are surrounded by hot air. Also, the ends of the tubes are usually brazed to tube headers. This results in numerous possibilities for leakage of high pressure fuel to lower pressure air. For applications envisioned by the present invention, limits of flammability in terms of temperature, pressure and fuel/air composition indicate possibilities for either fire or explosion. Neither possibility is acceptable in a manned aircraft.

Heat pipes are well known thermal devices for the efficient transport of thermal energy. A heat pipe is a closed structure containing a working fluid that transports thermal energy from one part, called the evaporator, where heat is supplied to the device, to another part, called the condenser, where heat is extracted from the device. Heat is transferred by means of liquid vaporization in the evaporator, vapor flow in the core region, vapor condensation in the condenser, and condensate return to the evaporator by capillary action in the wick.

SUMMARY OF THE INVENTION

The present invention provides a heat exchanger, particularly useful for high speed aircraft propulsion engines, for transferring heat from a hot fluid to a cool fluid using a plurality of heat pipes wherein the evaporator sections of the heat pipes are disposed in a hot fluid flow conduit and the condenser sections are disposed in a cold fluid flow conduit and the flow conduits are separated by a vented cavity. Furthermore thin heat transfer fins are provided around the condenser sections to enhance and control the heat transfer function of the invention.

One particular embodiment provides the heat exchanger with parallel conduits having hot and cold fluid inlets at opposite ends of their respective conduits such that the cold and hot fluids counterflow with respect to flow over the heat pipes.

A more particular embodiment provides for a means to supply aircraft engine fuel to the cold fluid flow inlet and hot air to the hot fluid flow inlet and that the cavity have a venting means to remove any fuel that may escape the cold flow fuel conduit.

Yet another embodiment provides a heat exchanger and reactor having a metalized, preferably with platinum, carbon fiber supported catalyst in the form of batting woven between the condenser sections of the heat pipes. The batting may be composed of catalytic metals such as platinum or mixtures of platinum and rhenium or iridium dispersed throughout the supporting carbon fibers in the form of particles or more preferably in the form of small crystallites, typically about 1 to 5 nanometers in size containing about 20 to 4000 metal atoms respectively.

ADVANTAGES

Heat exchangers constructed in accordance with the present invention provide an improved means to cool engine hot air with fuel and conversely heat cool fuel with engine hot air in an extremely safe manner with possibilities for leakage of high pressure fuel to lower pressure air within a heat exchanger. This in turn greatly reduces the risk of a fuel fire and subsequent explosion.

Another advantage provided by the present invention is the additional safety provided by a heat exchanger or reactor design which does not result in leakage of fuel to the hot air in the event of a failure in the fuel circuit.

Another advantage provided by the present invention is low sensitivity to the formation of gum, coke and other deposits in a fuel heat exchanger or reactor while using fuels which include ordinary jet fuel.

Yet another advantage provided by the present invention is a recondition in the pressure drop across catalytic beds associated with catalysts used in conjunction with endothermic fuels used in aircraft propulsion engines.

BRIEF DESCRIPTION OF THE DRAWINGS

The foregoing aspects and other features of the invention are explained in the following description, taken in connection with the accompanying drawing where:

FIG. 1 is a cut away perspective view of a combination heat exchanger and reactor of an aircraft propulsion system in accordance with the present invention.

DETAILED DESCRIPTION OF THE INVENTION

Illustrated in FIG. 1 is an exemplary embodiment of a combination heat exchanger and reactor for an aircraft propulsion system in accordance with the present invention and which, for the purposes of this patent, is herein referred to as heat exchanger 10. The heat exchanger 10 includes a cold fuel fluid conduit 14 having a fuel inlet 16 and a fuel outlet 18 effective to receive fuel from a fuel source (not shown) upstream of the heat exchanger. A hot fluid conduit which in this embodiment is a hot air conduit 20 having a hot air inlet 22 and a hot air outlet 23 is oppositely disposed with respect to the cold fuel conduit 14 and its inlet and outlet such that the hot fluid in the hot air conduit 20 flows in a direction opposite to the fuel flow in cold fuel conduit 14 (as shown by unlabeled arrows in FIG. 1) over a plurality of heat pipes 24 transversely disposed across both conduits.

The heat pipe 24 transfers heat by means of liquid vaporization in an evaporator section 26 (disposed in the hot air conduit 20), vapor flow in a core region 28, disposed in a cavity 30 between the hot air conduit 20 and the cold fuel fluid conduit 14, vapor condensation in a condenser section 32 (disposed in the cold fuel fluid conduit 14), and condensate return to the evaporator by capillary action in the wick 34. The cavity 30 is disposed between a hot sidewall 29 of the hot air conduit 20 and a cold sidewall 31 of the cold fuel fluid conduit 14, is preferably vented, as indicated by its being open at both ends, and thereby provides a venting means to remove any fuel that may escape the cold flow fuel conduit 14.

An important feature of the embodiment illustrated in FIG. 1 is a plurality of spaced apart thin heat transfer fins 40 in the form of thin heat transfer plates around the condenser sections 32 of the heat pipes 24. Another feature of the embodiment illustrated in FIG. 1 is a metalized, preferably with platinum, carbon fiber supported catalyst disposed between the condenser sections 32, preferably, in the form of batting 42 woven or otherwise disposed between the condenser sections 32 of the heat pipes 24. The metalized carbon fiber supporting catalyst batting permits the heat exchanger to function as a reactor for fuel conversion.

In operation the heat exchanger 10 in accordance with one embodiment of the present invention may be used to heat fuel and convert it from a liquid to a gas while at the same time cooling the air which is then used to cool the engine parts such as turbine blades (not shown) as illustrated in the following example. The hot air conduit 20 conducts hot air at, for example, inlet conditions of 1385 degrees F., 255 psia (pounds per square inch absolute) at the hot air inlet 22, and a flow rate of 45 pps (pounds per second). The cold fuel fluid conduit 14 conducts fuel in a direction opposite to that of the hot air at inlet conditions of 300 degrees F., 471 psia and 6.94 pps at the fuel inlet 16. The fuel in this example is JET-A aviation kerosene and the air is engine compressor discharge bleed air from a gas turbine engine compressor (not shown). The hot air exit conditions at the hot air outlet 23 are 1174 degrees F. and 248 psia. The fuel exit conditions at the fuel outlet 18 are 800 degrees F. and 448 psia. The fuel's critical temperature is approximately 700 degrees F. and its critical pressure is 250 psia, therefore, the fuel is maintained in a supercritical state and will not boil as it changes from a liquid to a gas at its critical temperature. Note the fact that Jet-A fuel is a hydrocarbon mixture infers a range of critical temperatures and pressure.

For the example illustrated herein the heat pipes 24 are 0.250 inch diameter and extend 1.5 inches into the hot air conduit 20 of the heat exchanger 10. The heat pipes are arranged such that the air flows across the heat pipes resulting in a very low 7 psi pressure loss on the air side. This is necessary in order that the air be at sufficient pressure to subsequently cool the engine turbine blades. This illustrates another advantage of the invention which permits the hot air conduit 20 to be configured independently of the cold fuel fluid conduit 14. The vented cavity 30 is maintained at a lower pressure than the hot air conduit 20 or the cold fuel fluid conduit 14. Therefore, any fuel which leaks from the cold fuel fluid conduit 14 through the cold sidewall 31 cannot pass through the hot sidewall 29 since flow cannot occur against a rising pressure gradient.

The condenser sections 32 of the heat pipes 24 are likewise somewhat independent of the evaporator sections 26 in terms of their extended length. This allows the condenser sections 32 to be somewhat independently designed in terms of heat transfer and pressure drop. Since a primary objective of the invention is to reduce sensitivity to fouling of the condenser sections 32 of the heat pipes 24, heat transfer fins 40 are attached to the condenser sections of the heat pipes. This results in a considerable increase in the heat transfer area available for use by the condenser sections 32 with correspondingly less need for high condenser section 32 heat transfer coefficient. This can be explained as follows:

$$\frac{1}{h_e} = \frac{1}{h} + \frac{1}{k/t}$$

Wherein:
$h_e$ = effective heat transfer coefficient
$h$ = film coefficient
$k/t$ = conduitance through a gum or coke deposit of conductivity k and thickness t.

In order to satisfy heat transfer for this example, h would be 1815 BTU/h ft2 degrees F. without the use of fins and 543 with fins. Correspondingly the heat transfer area of the fins plus heat pipes would be 71.3 ft2 and 386.2 ft2 respectively, with the fins efficiently equal to 91%. Assuming a coke build up of 0.010 inches at the time the heat exchanger requires cleaning (de-carborizing), the finned design will have lost 29% of its original (clean) performance. With the same degree of coke build up the design without fins would loss 69% of its performance. This fundamentally large difference in coke tolerance is a consequence of the fact the fuel side heat transfer rate is proportioned to h times heat transfer area. Since only h is effected by coke (area does not change), small h and large area is preferable.

Heat transfer fins 40 are provided for no purpose other than the transfer of heat. They are accessible during manufacture and serve no structural purpose. Therefore, unlike tubular heat exchangers the present invention provides a great deal of freedom in choosing an optimum surface in contact with the fuel. This fuel contact surface can therefore be tailored for minimum promotion of gum and coke deposits and minimum adherence of deposits should they occur.

Metal surfaces tend, in general, to promote gum through catalytic oxygenation chemical reactions, and coke through polymerization reactions. In the first case, metal surface may tend to strip hydrogen from the fuel molecule leaving a fuel radical which then reacts with oxygen and subsequently leads through other steps to a gum deposit.

$$RH + X \rightarrow R^* + HX$$

$$R^* + O_2 \rightarrow RO_2^* \rightarrow \text{deposits, gums, sediments}$$

where
RH is the fuel molecule
X is the surface metal
R* is a fuel radical

In the latter case, the metal surface may tend to catalytically convert alkane or cycloalkane molecules to aromatic molecules with production of molecular hydrogen. For example:

$$C_6H_{12} \rightarrow C_6H_6 + 3 H_2$$

$$C_6H_6 + C_6H_6 \rightarrow \text{polymer (coke)}$$

Reduction in the tendency of the surface to react with hydrogen atoms is one approach to reduces gum and/or coke formation. For example, the surface may be simply be exposed to a high temperature reducing environment such as hydrogen gas. Since this can also lead to hydrogen embrittlement, the non-structural aspect of the fin 40 is desirable. A tubular heat exchanger offers less selectivity for surface treatment since the tube is a critical structural member.

Adherence of gum and coke to a surface involves, in general, molecular attractive forces as opposed to chemical forces. These molecular forces relate to the shape of the molecule and its polarity. Treatment of the fin surface is such a way to reduce attractive polarity is somewhat similar to reducing the wettability of the surface. All surface and surface treatments behave differently in this regard. Again, the relationship to this invention is the freedom in design and producibility afforded by fins to apply surface treatments specifically aimed on reducing adherence of gums and cokes.

The platinum carbon fiber supported catalyst in the form of batting 42 disposed between the condenser sections 32 illustrates the means for applying the forementioned features of the present invention to a catalytic reactor. The addition of a catalyst permits dehydrogen of endothermic fuels such as methylcyclohexane (MCH) for additional heat transfer from the air to the fuel. All aspects of the present invention relative to heat transfer and coking tolerance are the same as previously described for the heat exchanger function. The only additional feature is contact between the fuel and a metallic catalyst as the fuel flows between the fins.

Metals such as platinum or mixtures of platinum and rhenium or iridium are dispersed throughout the carbon fibers in the form of small particles or more preferably in the form of crystallites typically about 1 to 5 nanometers in size. The carbon fibers are preferably woven in much the same way as fibers used for composite materials. Strips or batting 42 of the woven fibers are wrapped around the heat pipes 24 in a serpentine fashion so as to secure the strips of the batting in place. Strips of metallic catalyst containing woven fiber batting are placed between each fin row. The fiber weave is very loosely packed between the fins and heat pipes so as to cause little flow blockage and pressure drop. Turbulence promoted by fuel flow over the heat pipes promotes mixing and contact between MCH and the catalytic metal contained in the carbon fiber batting 42.

While the preferred embodiment of my invention has been described fully in order to explain its principles, it is understood that various modifications or alterations may be made to the preferred embodiment without departing from the scope of the invention as set forth in the appended claims.

I claim:
1. A reactor having a heat exchanger comprising:
   a cold fluid conduit,
   a hot fluid conduit spaced apart from said cold fluid conduit,
   a plurality of heat pipes having evaporator sections disposed in said hot fluid conduit and condenser sections disposed in said cold fluid conduit,
   heat transfer fins mounted on said condenser sections,
   a vented cavity between said hot fluid conduit and said cold fluid conduit, and
   a metalized carbon fiber supported catalyst disposed between said condenser sections.

2. A reactor as claimed in claim 1 wherein said metalized carbon fiber supported catalyst includes platinum as said catalyst.

3. A reactor as claimed in claim 2 wherein said platinum is disposed between carbon fibers in the form of small crystallites.

4. A reactor as claimed in claim 3 wherein said small crystallites are about 1 to 5 nanometers in size.

5. A reactor having a heat exchanger comprising:
a cold fluid conduit,
a hot fluid conduit spaced apart from said cold fluid conduit,
a plurality of heat pipes having evaporator sections disposed in said hot fluid conduit and condenser sections disposed in said cold fluid conduit,
heat transfer fins mounted on said condenser sections,
a vented cavity between said hot fluid conduit and said cold fluid conduit,
a cold fluid inlet and a cold fluid outlet at opposite ends of said cold fluid conduit,
a hot fluid inlet and a hot fluid outlet at opposite ends of said hot fluid conduit and oppositely disposed to said hot fluid inlet and said hot fluid outlet such that a hot fluid flow direction in said hot fluid conduit has a direction opposite to a cold fluid flow direction in said cold fluid conduit,
said plurality of heat pipes transversely disposed through said conduits normal to said flow directions,
a metalized carbon fiber supported catalyst interwovenly disposed between said condenser sections, and
a platinum catalyst disposed between carbon fibers in the form of small crystallites.

* * * * *